Aug. 23, 1966  W. D. DAWALT ET AL  3,267,653
HEADER CONTROL FOR COTTON PICKER
Filed Aug. 13, 1963  4 Sheets-Sheet 1

INVENTORS.
WINFIELD D. DAWALT and
BY PRESTON M. WRIGHT
Lockwood, Woodard, Smith & Weikart
Attorneys INVENTORS.
WINFIELD D. DAWALT and
PRESTON M. WRIGHT
BY
Lockwood, Woodard, Smith & Weikart
Attorneys Aug. 23, 1966 W. D. DAWALT ET AL 3,267,653
HEADER CONTROL FOR COTTON PICKER
Filed Aug. 13, 1963 4 Sheets-Sheet 4

INVENTORS.
WINFIELD D. DAWALT and
BY PRESTON M. WRIGHT

Lockwood, Woodard, Smith & Weikart
Attorneys

United States Patent Office 3,267,653
Patented August 23, 1966

3,267,653
HEADER CONTROL FOR COTTON PICKER
Winfield D. Dawalt and Preston M. Wright, Elwood, Ind., assignors to Roper-Wright Manufacturing Co., Inc., Elwood, Ind., a corporation of Indiana
Filed Aug. 13, 1963, Ser. No. 301,722
3 Claims. (Cl. 56—11)

This invention relates generally to header control apparatus for harvesting machines, and it relates more particularly to a header control system for harvesting machines, such as cotton pickers and the like, which include a plurality of adjustable headers adapted to harvest crops planted in rows.

Conventional multiple header harvesting machines, such as cotton pickers, include spindle drums spaced apart from one another to pick cotton from each side of a row of cotton plants. The headers are hinged to the frame of the harvesting machine and may be elevated and lowered by means of a manually controlled hydraulic system. In operation the operator of the machine must constantly control the height of the headers in order to avoid gouging of the headers into the earth and also in order to adjust the spindle drums so that they will pick cotton from the plants which are close to ground level. Such operation is extremely difficult since the operator can do little more than correct the header adjustment after the drums have gouged into the earth or after looking behind the machine to obesrve that the low cotton bolls are not being gathered.

Manual control of headers to avoid over or under compensation for irregularity of terrain is practically impossible. Furthermore, at the end of each row of plants the headers must be elevated as the machine is turned around for picking the next row. It is then necessary to readjust the header height, and the first 50 feet to 75 feet of picking is of poor quality because of the header readjustment which is necessary.

With manual header control there is substantial damage to the spindles of the header due to dirt, stones, and other debris, which may be thrown into contact with the spindles. This causes lost operation time for repairs which are costly in and of themselves and which are costly due to intervening adverse weather conditions. Cotton is discolored progressively with additional wetting, and if a substantial amount of dirt is thrown into the picked cotton, both of these factors lower the price obtainable for the cotton.

The prior art includes automatic systems for controlling the headers of harvesting machines, but they are generally unsatisfactory because they do not operate efficiently to avoid gouging the earth or to efficiently harvest the crop. Great difficulty has been experienced in providing a control system which will maintain the header at the proper elevation, mainly due to the fact that the feeler mechanisms are not of the proper structure and are not properly located to effect elevating or lowering of the header at the exact time that such elevation or lowering is necessary.

Also, the control systems of the prior art are incapable of applying a uniform rate of elevation or rate of lowering of the headers. The motion of the headers is jerky to such an extent that the rear wheels of the picker may be lifted from the ground when jerky application of lifting force is applied to the headers. This not only causes gouging but also causes excessive wear and damage to many parts of the harvesting machine.

The principal object of this invention is to provide an automatic control system for harvesting machines wherein the header or a plurality of headers may be elevated and lowered automatically in response to ground feeler devices for preventing earth gouging by the header or headers and for maintaining the header or headers at the most efficient position for harvesting a given crop.

Another object of this invention is to provide, in a harvesting machine having a single header or a plurality of headers, an automatically controlled system for elevating and lowering the header or headers in response to feeler devices disposed on either side of a row of crop producing plants whereby irregularities of the ground surface on either side of a row of plants will operate the system to prevent earth gouging.

Still another object of this invention is to provide an automatic control system for a cotton picking machine having one or more pairs of cotton picking drums.

A further object of this invention is to provide control apparatus for hydraulic systems for harvesting machines wherein the header or headers of such machines may be controlled by a preloaded valve mechanism to prevent jerky motion of the header or headers during elevation or lowering thereof.

A still further object of this invention is to provide in a harvesting machine means for controlling a plurality of headers comprising a single manual selector valve which controls the operation of a plurality of metering valves and wherein there is provided a flow-divider for providing the required amount of fluid flow between the selector valve and the metering valves.

In accordance with this invention there is provided a harvesting machine having at least one header mounted for vertical movement and adapted to harvest a crop, such as cotton, from both sides of a row of plants, and a hydraulic system having a ram for elevating and lowering said header and including a control valve and feeler means adapted to effect operation of said ram in response to movement of the feeler means by the surface of the ground over which the harvesting machine is traveling.

Also in accordance with this invention there is provided a hydraulic system for elevating and lowering the header or headers of a harvesting machine comprising a manually controlled selector valve, a metering valve selectively controllable by said selector valve for providing automatic or manual control of said hydraulic system, and a plurality of feeler devices coupled to said metering valve for controlling flow in the hydraulic system to elevate and lower the header in response to changes in elevation of the ground.

The full nature of the invention will be understood from the accompanying drawings and the following description and claims:

Figure 1:
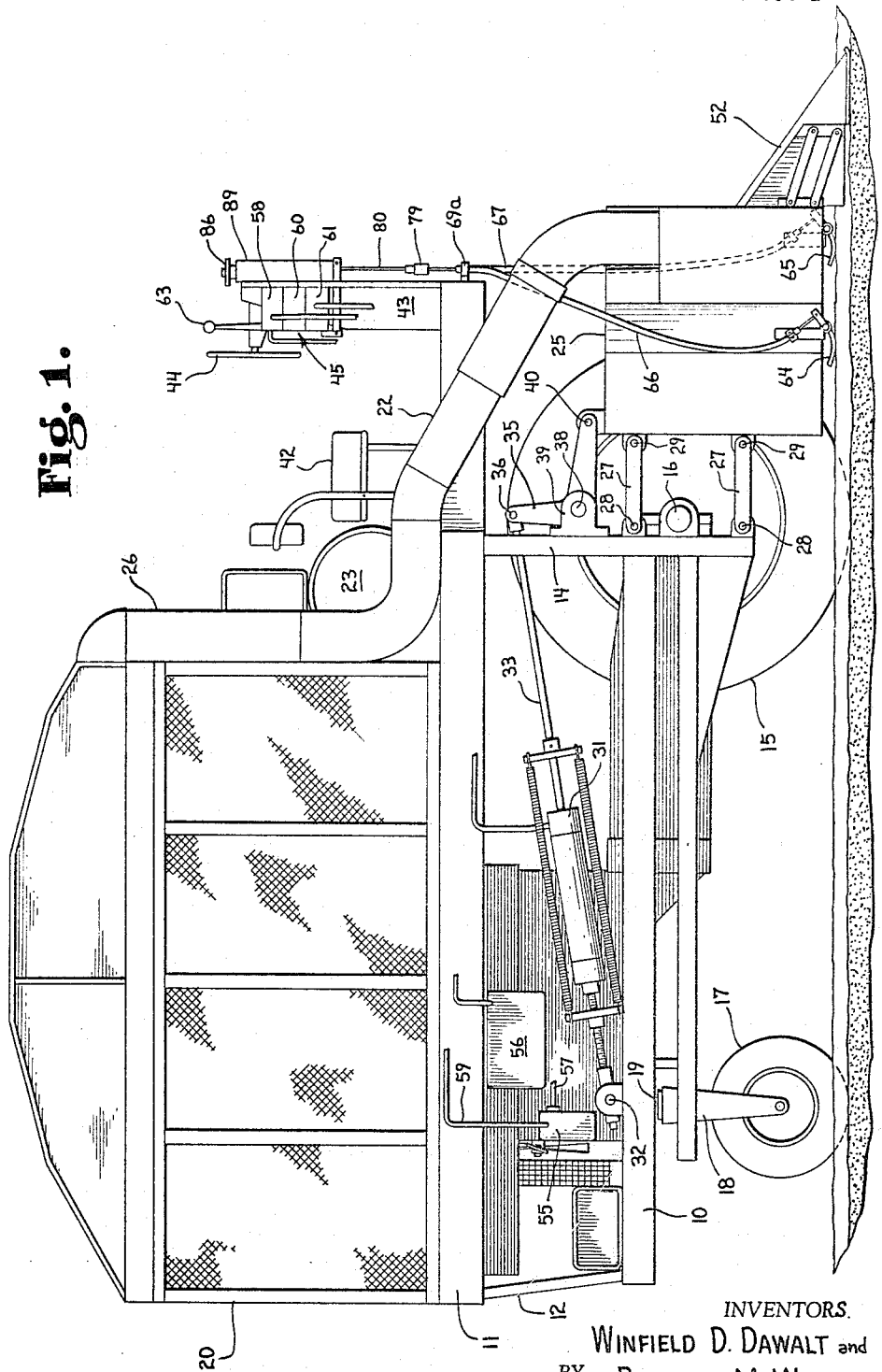
FIG. 1 is a side elevation view of a cotton picking machine embodying this invention.
Figure 2:
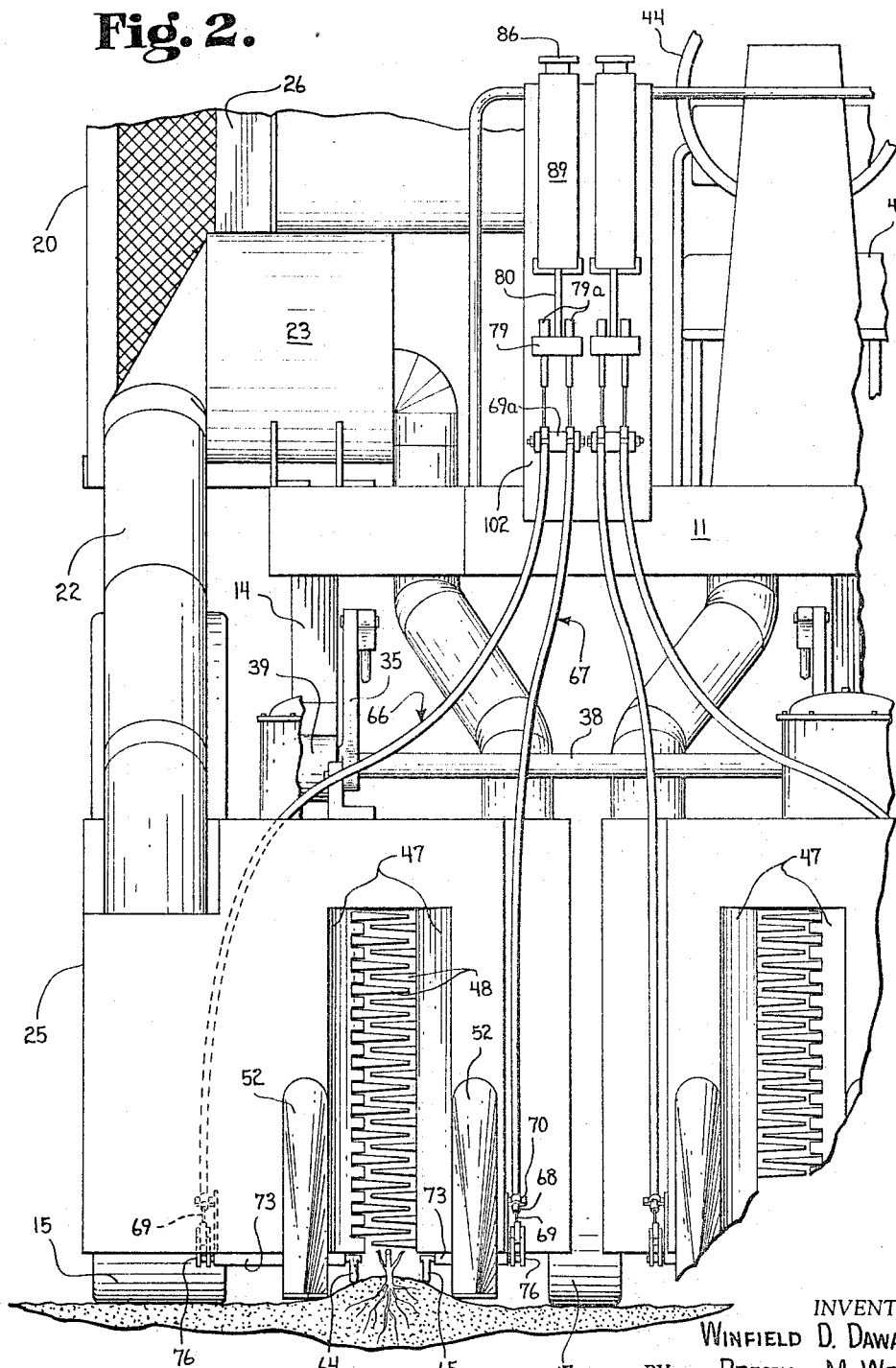
FIG. 2 is a partial front elevation of the machine illustrated in FIG. 1.

Referring to the drawings, FIGS. 1 and 2 illustrate a conventional cotton picking machine having an automatic control system for elevating and lowering the headers to prevent earth gouging and also to maintain the headers at the most efficient location with respect to the crop being harvested. While this invention is particularly adaptable for control of cotton picking machines, it will be understood that the invention is also applicable to other harvesting machines having headers for collecting crops, and especially such crops as are planted in rows.

The cotton picking machine comprises a frame structure including a lower sill 10, an upper sill 11 and vertical support members 12 and 14. The drive wheels 15 are rotatably mounted on an axle 16 at the forward end of the frame, while a steering wheel 17 may be mounted to a fork 18 pivotally mounted to the frame at 19 adjacent the rear end thereof. A collection bin 20 may be mounted on the upper sill member 11, and a duct 22 may be connected through a blower 23 to suck cotton from the header mechanism 25 and deliver it into the bin through the exhaust portion 26 of the duct. The header mechanism may be supported from the frame by means of parallel arms 27 pivotally mounted to the frame at 28 and pivotally connected to the header at 29. For elevating and lowering the header mechanism 25 there is provided a hydraulic cylinder anchored to the frame by a pivot mechanism 32 and including a piston rod 33 pivotally connected to a bell crank 35 at the pivot point 36. The bell crank may be pivotally mounted at 38 to a bearing block 39 fixed in any suitable manner to the vertical frame member 14. Bell crank 35 may be pivotally connected to the header mechanism at 40. The forward end of the sill 11 provides support for an operating platform (not shown) on which is supported a driver's seat 42 and a control column 43. A steering wheel 44 and the control valves indicated generally at 45 may be supported on the column 43. It will be understood that the harvesting machine described so far is conventional, and many other types of particular machines may be controlled by the system incorporating this invention.

Figure 3:
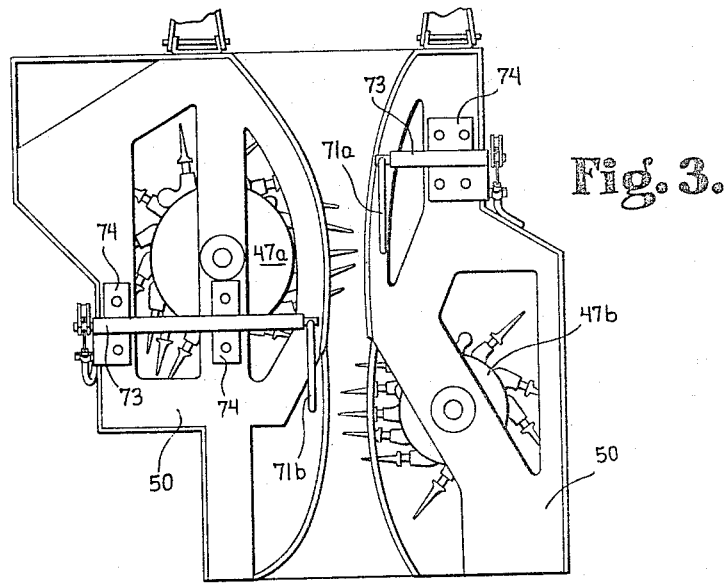
FIG. 3 is a partial bottom view of the header mechanism of the machine illustrated in FIGS. 1 and 2.

The header mechanism of a conventional cotton picking machine includes suitable frame structure for rotatably mounting vertical drums 47 which are equipped with so-called spindles 48 so arranged that they are in staggered relation with one another as illustrated in FIG. 2. Each pair of drums picks the cotton from a single row of cotton plants, the spindles of one drum picking one side of the row and the spindles of the other drum picking the other side of the row. FIG. 3 illustrates the lower frame members 50 to which the drums are rotatably mounted, and it will be noted that one drum of each pair is mounted rearwardly of the other drum of each pair. In accordance with convention the header mechanism includes a pair of gathering shields 52.

The hydraulic system as provided by this invention for manually and/or automatically elevating and lowering the headers of the harvesting machine comprises a pump 55 driven by the harvesting machine engine and connected to a reservoir 56 by hose 57. The output of the pump is connected with a manually controlled four-way selector valve 58 to a hose 59. Valve 58 may be connected to a flow divider 60 which, in turn, may be connected to a pair of metering valves 61 and 62. While valve 58 is controlled manually by a lever 63, the metering valves are controlled by feeler members 64 and 65 through flexible cables 66 and 67, respectively.

Each cable comprises an outer sheath indicated at 68 and a flexible wire core 69. The sheath 68 may be clamped at its upper end to the column 43 by any suitable clamping device 69a, and at its lower end to the outer cover of the header as indicated at 70. The feelers 64, 65 are identical in structure and include a ground contacting arm 71 fixed to an elongated shaft 72 journaled in a bearing member 73 attached to the bottom frame 50 of the header by means of plate members 74 so that arms 71 may rotate in a vertical plane when they contact hummocks in the earth or other obstructions, such as stones. The feelers may be connected to the flexible cores 69 by means of arms 76 which are fixed in any suitable manner to the shafts 72. Holes 77 are provided in arms 76 so that the ends of the cores 69 may be connected at different radii in respect to shaft 72.

It will be noted that the feelers 71 are staggered with respect to one another. For example, feeler 71a is located opposite the forward drum 47a, while feeler 71b is located opposite the rear drum 47b. The staggered relation of the feelers prevents the header from dropping when it passes over a small depression in the earth. On the other hand, the feelers are disposed preferably about 3" to either side of the center of the row of plants which is being harvested. Thus, any elevation in the earth's surface adjacent either of the picking drums will operate one or both of the feelers to elevate the header so that there will be no gouging. Any depression adjacent either drum must be sensed by both feelers before the header can drop. Thus, each drum of each header is individually protected.

To this end the upper ends of the cores 69 are slidably connected to a yoke 79, stop nuts 79a being attached to the core ends for engaging the yoke and pulling it downwardly when either of the feelers pulls on the cores. Obviously both feelers must move downwardly before the yoke can move upwardly. Yoke 79 includes a rod 80 having a nut 81 and washer 82 at its free end. The washer 82 bears on a spring 83 which in turn engages the lower end of a cylindrical member 84. Member 84 is threaded to a rod 85 which in turn has an adjustable nut 86 threaded on its outer end. The metering valve includes an operating arm 88, to the outer end of which is mounted a cylindrical member 89 which houses members 80, 81, 82, 83, 84, 85, and nut 86 bears on the upper end of member 89 whereby movement of either one of the cores 69 imparts movement to the valve control arm 88.

Each of the metering valves 61 and 62 has a control arm 88 pivotally mounted at 91 to a portion 92 of the metering valve body. The portion 92 includes additional holes 93 within which the pivot of arm 88 may be mounted in order to provide an adjustable degree of movement of the upper end 94 of arm 88. The portion 92 also includes a bracket 95 which receives an adjustable threaded stop member 96 on which is threaded a locknut 97. By adjusting the stop 96 the anglar movement of member 94 may be limited in a counterclockwise direction. The arm 88 bears adjacent its outer end on a biasing spring 99 supported by a bolt 100 which is in turn supported from a shelf member 101 which forms a part of a bracket 102 which may be attached to the column 43. The bracket 102 also serves to support the selector valve 58, flow divider 60 and the metering valves 61 and 62 by means of nuts 103 which are threaded on to bolts (not shown) attached to the body of valve 58.

Figure 4:
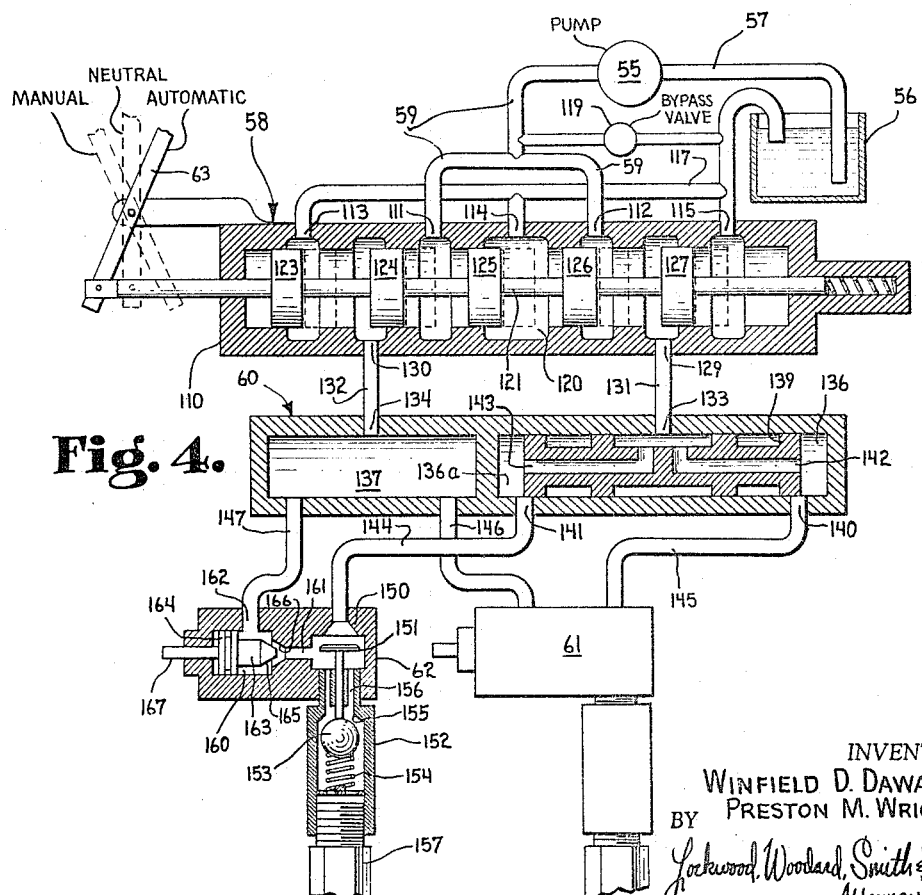
FIG. 4 is a schematic diagram of the hydraulic system for controlling elevation and lowering of the header mechanism embodied in the machine illustrated in FIGS. 1, 2 and 3.

Referring to FIG. 4 of the drawings, the hydraulic system is illustrated schematically for explanation of the operation of the valves. The selector valve 58 may be of any suitable mechanical structure having the ports and the valve spool which will operate to control flow of fluid as will be described in the following. The same is true of the flow divider valve 60. The metering valves 61 and 62 are illustrated substantially in their true mechanical form.

Selector valve 58 comprises a body portion 110 having ports 111 and 112 connected through the tubing 59 to the output of pump 55. Ports 113, 114 and 115 are all connected through a tube or hose 117 to reservoir 56. The hydraulic system includes a pressure responsive overload bypass 119.

The schematic illustration of valve 58 shows a single chamber 120 within which is slidably mounted the spool 121. A plurality of lands 123, 124, 125, 126 and 127 are carried by spool 121 and are operative to open and close valve ports as will be described.

The body 110 of valve 58 also includes ports 129 and 130 which are connected to the flow divider by means of tubes 131 and 132, tube 131 connecting to port 133 and tube 132 connecting to port 134. The flow divider includes two chambers 136 and 137. A slidable spool 139 is housed within chamber 136 and overlaps each of the output ports 140 and 141. The spool 139 includes passages 142 and 143 which are open into the right and lefthand ends of chamber 136 so that fluid may flow to both of the ports 142 and 141. The ports 140 and 141 are connected to metering valves 61 and 62 through tubes 145 and 144 respectively. The flow divider spool positions itself automatically in response to the differential pressure as between tubes 145 and 144 to divide flow of fluid in such a manner that there is always equal pressure in the chambers 136 and 136a and equal volume flow in tubes 145 and 144. The chamber 137 of the flow divider is connected to the metering valves by tubes 146 and 147.

Each of the metering valves 61 and 62 has identical structure. There is provided within the bodies of these valves a check valve chamber 150 wherein there is mounted a poppet valve 151. The stem of valve 151 projects into a check valve housing 152 and bears on a ball check valve 153 supported on a coil spring 154 and normally biased toward a valve seat 155 for controlling flow through an annular port 156. The check valve housing 152 receives a hose connection 157 which is connected to one end of the hydraulic ram 31. It will be noted that poppet valve 151 may push the ball check 153 off its seat 155 or the ball check may be operated by its spring or by pressure within the chamber 150.

The metering valves also include a metering chamber 160 connected to chamber 150 by a passage 161 and including a port 162 to which is connected the tube 147. A metering valve 163 is slidably mounted within chamber 160 on the lands 164 and is provided with a tapered end 165 adapted to engage the conical seat 166. The stem 167 of valve 163 projects outwardly through the valve body for engagement with the portion 94 of the control arm 88 whereby movement of the control arm pushes valve 163 toward its seat, and pressure within chamber 160 acts on the lands 164 to force valve 163 in the opposite direction.

Figure 5:
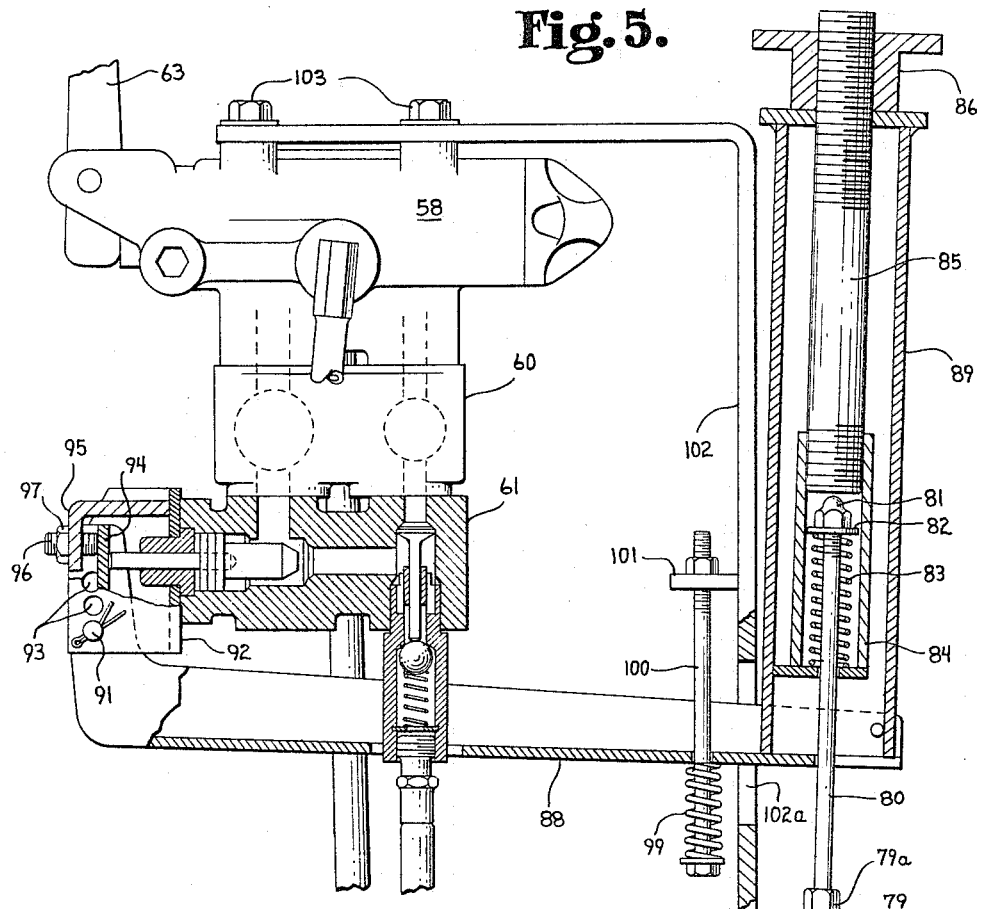
FIG. 5 is a partial cross sectional view illustrating the control valves shown in FIG. 4 and including the control mechanism for said valves.
Figure 6:
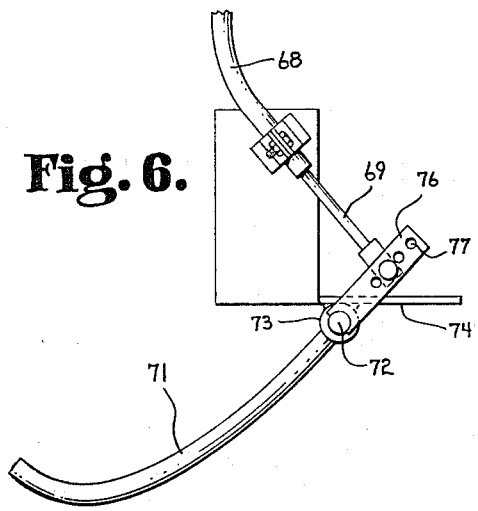
FIG. 6 is an enlarged view of a feeler device adapted to be connected to the valve control mechanism shown in FIG. 5.

Referring to FIGS. 4 and 5, the selector valve 58 is operable to select manual or automatic operation of the hydraulic system or can be moved to the neutral position for locking the header at any desired elevation with respect to the ground. When the control lever 63 is positioned in neutral, as indicated in FIG. 4, flow of fluid from pump 55 through ports 111 and 112 and through ports 129 and 130 is blocked by lands 124 and 126. Pump fluid then flows from ports 111 and 112 through port 114 and hose 117 to reservoir 56. Lands 123 and 124 prevent any flow of fluid through port 130 in either direction, and lands 126 and 127 prevent any flow of fluid through port 129 in either direction. Consequently in metering valve 62, for example, check valve 153 is closed, and the ram 31 is locked in any desired fixed position.

The header may be controlled manually by moving lever 63 to the manual lift position indicated in FIG. 4. Land 124 of valve 58 is then positioned to permit flow of fluid from the pump through port 111 through ports 130, 134 through chamber 137 of the divider valve 60 through hose 147 to the metering valve chamber 160. Land 126 is positioned to block flow of fluid from the pump through port 112 and port 129. Consequently, there is no pressure on the poppet valve 151, and it assumes its closed position. When fluid flows into the metering chamber 160 the pressure acts on the lands 164 to move the metering valve plug 163 to its open position whereby fluid flows into the poppet valve chamber 150 creates sufficient pressure on the ball check valve 153 to move it to its open position whereby full pump pressure operates the ram 31 to move the piston rod 33 to the left (FIG. 1) which causes elevation of the header. Elevation continues until the lever 63 is moved to the neutral position, thereby to lock the header at a desired elevation.

To effect lowering of the header, the lever 63 may be moved to its automatic position indicated in FIG. 4. This causes the lands to assume the full-line position indicated in FIG. 4 where fluid flows from the pump through port 112, ports 129 and 133, through the flow divider valve and the ports 140 and 141 thereof, through tubes 144 and 145 in equal volume. Considering metering valve 62, tube 144 impresses pump pressure on poppet valve 151 causing this valve to open. In turn, check valve 153 is opened by poppet valve 151. Since the header is in an elevated position, the feelers 64 and 65 will have dropped, causing the cables 69 and yoke 79 to move upwardly and cause lever 88 to rotate in a counterclockwise direction (FIG. 5). Portion 94 of lever 88 moves away from metering plug 163 so that it may assume its open position.

When the metering plug is in its fully open position, the pressure relationships within chamber 150 are such that pump pressure causes valve 151 to remain open and hold valve 153 in open position. Fluid flows out of the ram and past check valve 153 through chamber 150, passage 161, into chamber 160 and through hose 147, through chamber 137, through hose 132, into the selector valve and through port 113 thereof into hose 117 and into the reservoir 56. Downward movement of the header may be stopped manually by moving lever 63 to the neutral position. Alternatively, lever 63 may be left in the automatic position, and the header continues its downward movement until one or both of the feelers 64, 65 engage the ground. Such engagement moves cables 69 downwardly thereby to pull yoke 79 and lever 88 downwardly to move the metering plug 163 toward its seat 166, and flow of fluid through the metering valve is reduced to such an extent that the pump pressure causes fluid to flow to the ram until the feelers assume their normal preset position and therewith plug 163 resumes its normal position which is partially open. In this stage of operation, the metering valve passes enough volume of fluid to create a pressure in chamber 150 equal to pressure in the ram necessary to physically carry the header and stop the movement of the ram and stop the downward movement of the header.

During normal operation of the harvesting machine, lever 63 may remain in its automatic position whereby fluid constantly flows through the metering valve holding the poppet valve 151 open which, in turn, holds the ball check 153 open. Furthermore, the metering plug 163 is normally slightly open to pass pump volume but to maintain a balance of pressure within chamber 150 which counteracts the ram pressure and maintains sufficient ram pressure to hold the weight of the header. Thus, the header may be held at its idle elevation with respect to the ground for harvesting the crop. When either of the feelers 64 or 65 ride over an obstacle or hummock in the ground, cables 69 move downwardly moving lever 88 in a clockwise direction and moving the metering plug 163 toward a closed position. This causes increased pressure within chamber 150, and such pressure causes fluid flow to the ram and elevates the header until both of the feelers reach their normal positions with respect to the header, at which time cable 69 will have moved upwardly and will have imparted counterclockwise movement to lever 88 to permit metering plug 163 to open enough to maintain pressure in the ram necessary to carry the weight of the header.

When the feelers enter a depression in the ground sufficient to permit them to drop, a reverse action occurs wherein the cables 69 cause raising of the arm 88. This action allows the metering plug 163 to move away from its seat to such a degree that oil flows out of the cylinder and the header drops until one or both of the feelers resume their normal position. Thus, the elevation of the header is automatically controlled in response to any change of position of the feelers. Speed of header movement upwardly or downwardly is directly proportional to the speed of movement of the feelers and, therefore, the header is always maintained at a preset elevation with respect to the ground where it is contacted by the feelers.

Reference has been made to the normal position of the feelers, and this position is determined by several adjustments. First of all, the spacing between the feelers and the bottom of the headers is controlled by adjustment of members 85, 86 and 89. The pressure with which the feelers contact the ground is controlled by the adjustment of the bolt 100 to increase tension of spring 99. Adjustment of bolt 96 and nut 97 is preset to position arm 88 with respect to hole 102a in arm 102. The resistance to flow of fluid by plug 163 through the metering valve causes arm 88 to exert upward tension on cables 69 which, in turn, causes the feelers to engage the ground with a certain desired degree of pressure. At the desired setting of the plug 163 there is usually always flow of fluid from chamber 159 through metering chamber 160. The action of the feelers causes variation of this flow but seldom, if ever, causes complete stoppage of flow. Consequently, when the feelers move upwardly, for example, there is no abrupt shock because of abrupt application of fluid pressure to the ram. The flow of fluid through metering chamber 160 merely changes in respect to volume and pressure, and this action prevents jerky control of the ram and the header.

The description of the operation of the hydraulic system refers to the metering valve 62 which effects control of a single header. FIG. 2 shows a cotton picking machine having two headers and, thus, such a machine would be equipped with the second metering valve 61, and this valve would operate in the same manner in response to connection with valve 62.

In order to operate the two metering valves from the single selector valve 58 there is provided the flow divider valve 60 which distributes flow of fluid in such a manner that the demands of both metering valves can be satisfied. At any given time valve 62, for example, may be creating back pressure on the spool 139 of the flow divider valve 60 equal to the back pressure from the valve 61. In this case the spool assumes the position shown in FIG. 4 wherein equal amounts of fluid flow to each of the metering valves. If valve 62, for example, is using greater pressure than valve 61, the back pressures will be such that the spool 139 will be moved to a position closing port 141 until flow of fluid through ports 140 and 141 will be equalized.

From the foregoing description it will be apparent that the automatic header control system of this invention has a high degree of sensitivity which makes it possible to maintain the headers of a harvesting machine at a predetermined height with respect to the ground level, thereby to prevent gouging and collection of dirt and debris. In the case of a cotton picking machine it is preferable that the feelers be located approximately 3 inches from the center of the row of plants and that the system be adjusted to maintain the lowest part of the headers about 1 inch above the ground. As illustrated in the drawings, the feelers are located opposite to the picking devices and, thus, there is optimum certainty that the picking devices will be maintained in their most efficient picking position, and at the same time, the headers will be prevented from gouging the ground. This invention also provides an automatically controlled hydraulic system of such character that a single manual selector valve may control the operation of a plurality of metering valves and therewith may control a plurality of headers.

This invention has the further advantage that the speed of elevation or lowering of the header is controlled by the speed of operation of plug 163. It will be obvious that rapid movement of the plug in either direction will also cause rapid control of the header. It should also be noted that the plug 163 normally maintains a balance of pressure within the metering valve in that movement of the plug does not normally stop or start flow of fluid. There being continuous flow of fluid past the plug, there is never a zero pressure condition and, consequently, there is never a sudden change from zero pressure to maximum pressure or from maximum pressure to zero pressure. As a consequence, there is no jerky movement of the header which can create damaging forces on other parts of the harvesting machine.

The invention claimed is:

1. A crop picking apparatus comprising a vehicle having a frame, a header pivotally mounted on said frame for vertical movement and comprising a forward crop picking device and a rear crop picking device spaced laterally and rearwardly of said forward picking device for traversing both sides of a row of crop-bearing plants, a hydraulic system including ram means coupled to said header and said frame, control valve means connected to said ram means for selectively operating said ram means to elevate or lower said header, and ground-contacting feeler means comprising a first pivoted arm disposed laterally of said forward picking device and forwardly of said rear picking device and a second pivoted arm disposed laterally of said rear picking device and rearwardly of said forward picking device, said feeler means being connected to said control valve means for elevating or lowering said header in response to variations in ground level.

2. A crop picking apparatus comprising a vehicle having a frame, a header pivotally mounted on said frame for vertical movement and comprising a forward crop picking device and a rear crop picking device spaced laterally and rearwardly of said forward picking device for traversing both sides of a row of crop-bearing plants, a hydraulic system including a ram means coupled to said header and said frame, control valve means connected to said ram means for selectively operating said ram means to elevate or lower said header, and ground-contacting feeler means comprising a first element disposed laterally of said forward picking device and forwardly of said rear picking device and a second element disposed laterally of said rear picking device and rearwardly of said forward picking device, said feeler means being connected to said control valve means for elevating or lowering said header in response to variations in ground level.

3. A crop picking apparatus comprising a vehicle having a frame, a header pivotally mounted on said frame for vertical movement and comprising a forward crop picking device and a rear crop picking device spaced laterally and rearwardly of said forward picking device for traversing both sides of a row of crop-bearing plants, a hydraulic system including ram means coupled to said header and said frame, control valve means connected to said ram means for selectively operating said ram means to elevate or lower said header, and ground-contacting feeler means comprising a first element disposed laterally of said forward picking device and forwardly of said rear picking device and a second pivoted arm disposed laterally of said rear picking device and rearwardly of said forward picking device, said feeler having a one-way connection to said control valve means for elevating said header in response to sensing of a rise in ground level by either of said elements and for lowering said header only in response to sensing of a depression in ground level by both of said elements.

References Cited by the Examiner
UNITED STATES PATENTS

| | | | |
|---|---|---|---|
| 2,660,015 | 11/1953 | Briscoe | 56—11 |
| 2,674,075 | 4/1954 | Snow | 56—11 |
| 2,700,857 | 2/1955 | Stearman | 56—11 |
| 2,972,847 | 2/1961 | Matthews | 56—11 |
| 3,088,264 | 5/1963 | Sallee | 56—11 |
| 3,196,599 | 7/1965 | Meiners et al. | 56—11 |

ABRAHAM G. STONE, *Primary Examiner.*

M. C. PAYDEN, *Assistant Examiner.*